United States Patent
Berlin (10) Patent No.: US 10,043,173 B2
(45) Date of Patent: *Aug. 7, 2018

(54) SAFE FOOD ORDERING BY VOICE WHILE DRIVING

(71) Applicant: U.S. Group Corporation, Minneapolis, MN (US)

(72) Inventor: Judd Berlin, Pune (IN)

(73) Assignee: U.S. Group Corporation, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/629,102

(22) Filed: Jun. 21, 2017

(65) Prior Publication Data

US 2017/0286942 A1 Oct. 5, 2017

Related U.S. Application Data (63) Continuation of application No. 14/716,308, filed on May 19, 2015, now Pat. No. 9,715,685.

(51) Int. Cl.
*G06Q 20/32* (2012.01)
*G06Q 20/34* (2012.01)
(Continued)

(52) U.S. Cl.
CPC ......... *G06Q 20/322* (2013.01); *G06Q 20/202* (2013.01); *G06Q 20/32* (2013.01); *G06Q 20/34* (2013.01); *G06Q 30/00* (2013.01); *G06Q 30/06* (2013.01); *H04W 4/027* (2013.01); *G06Q 50/12* (2013.01)

(58) Field of Classification Search
CPC ...... G06Q 20/32; G06Q 50/12; G06Q 20/322; G06Q 20/34; G06Q 30/00; G06Q 30/06; H04W 4/027
See application file for complete search history.

(56) References Cited

U.S. PATENT DOCUMENTS 5,475,740 A 12/1995 Biggs, Jr. et al.
6,473,739 B1 10/2002 Showghi et al.
(Continued)

OTHER PUBLICATIONS

"U.S. Appl. No. 14/716,308, Advisory Action dated May 9, 2016", 3 pgs.

(Continued)

*Primary Examiner* — Asfand M Sheikh
(74) *Attorney, Agent, or Firm* — Schwegman Lundberg & Woessner, P.A.

(57) ABSTRACT

Techniques for safe food ordering by voice while driving are described. A customer driving a vehicle decides to order food from a restaurant. The customer launches a food-ordering app on the customer's smartphone. The app detects that the vehicle is moving, disables manual input into the smartphone, and connects to a terminal at a call center. A customer service representative ("CSR") at the call center communicates with the customer using spoken language to obtain the details of the food order, enters the food order into an ordering system, and transmits the food order via the ordering system to the restaurant for fulfillment. Finally, the customer picks up the ordered food at the restaurant, possibly using a drive-thru window at the restaurant. Thus, the customer is able to complete an order for food without having to stop driving and without averting their eyes from the road.

20 Claims, 7 Drawing Sheets

(51) Int. Cl.
  *H04W 4/02* (2018.01)
  *G06Q 30/00* (2012.01)
  *G06Q 30/06* (2012.01)
  *G06Q 20/20* (2012.01)
  *G06Q 50/12* (2012.01)

(56) References Cited

U.S. PATENT DOCUMENTS

| | | |
|---|---|---|
| 6,880,750 B2 | 4/2005 | Pentel |
| 8,428,973 B1 | 4/2013 | Hopkins, III |
| 8,989,820 B2 | 3/2015 | Czaja et al. |
| 9,715,685 B2 | 7/2017 | Berlin |
| 2004/0230496 A1 | 11/2004 | Neuman et al. |
| 2005/0015256 A1 | 1/2005 | Kargman |
| 2005/0267811 A1 | 12/2005 | Almblad |
| 2008/0009296 A1 | 1/2008 | Han |
| 2010/0114734 A1 | 5/2010 | Giuli et al. |
| 2016/0342972 A1 | 11/2016 | Berlin |

OTHER PUBLICATIONS

"U.S. Appl. No. 14/716,308, Final Office Action dated Feb. 23, 2016", 16 pgs.

"U.S. Appl. No. 14/716,308, Non Final Office Action dated Jun. 16, 2016", 16 pgs.

"U.S. Appl. No. 14/716,308, Non Final Office Action dated Aug. 14, 2015", 16 pgs.

"U.S. Appl. No. 14/716,308, Notice of Allowability dated Apr. 12, 2017", 10 pgs.

"U.S. Appl. No. 14/716,308, Notice of Allowance dated Mar. 20, 2017", 15 pgs.

"U.S. Appl. No. 14/716,308, Response filed Apr. 25, 2016 to Final Office Action dated Feb. 23, 2016", 12 pgs.

"U.S. Appl. No. 14/716,308, Response filed Nov. 16, 2015 to Non Final Office Action dated Aug. 14, 2015", 24 pgs.

"U.S. Appl. No. 14/716,308, Response filed Dec. 7, 2016 to Non Final Office Action dated Jun. 16, 2016", 22 pgs.

"U.S. Appl. No. 14/716,308, PTO Response to Rule 312 Communication dated Jun. 27, 2017", 2 pgs.

U.S. Appl. No. 14/716,308, filed May 19, 2015, Safe Food Ordering by Voice While Driving.

SAFE FOOD ORDERING BY VOICE WHILE DRIVING

PRIORITY

The application is a continuation of U.S. patent application Ser. No. 14/716,308, filed May 19, 2015, which is incorporated by reference herein in its entirety.

TECHNICAL HELD

The present disclosure generally relates to mobile devices and specifically to techniques for safe food ordering by voice while driving.

BACKGROUND

In the United States of America, texting while driving causes 25% of all car accidents, 11 teen deaths every day, and over 330,000 injuries per year. A driver is approximately 6 times more likely to cause an accident by texting while driving than driving intoxicated. At the same time, more and more fast food restaurants (e.g., quick serve restaurants or "QSRs") offer smartphone apps that allow users to order food, possibly while driving. Approximately two-thirds of all QSR orders are placed by customers in a vehicle and fulfilled at a QSR drive-thru.

BRIEF DESCRIPTION OF THE DRAWINGS

Some embodiments are illustrated by way of example and not limitation in the figures of the accompanying drawings.

DETAILED DESCRIPTION

The present disclosure describes methods, systems, and computer program products that individually provide safe food ordering by voice while driving. Currently, apps exist that allow customers to order food on their smartphones, possibly while driving. Most of these apps require manual user input, such as entering text via a keyboard or selecting graphical user interface controls (e.g., buttons), to designate the details of the customer's food order. For example, U.S. Pat. No. 6,880,750, to Pentel, entitled "Remote ordering device," discloses placing orders using cell phones. However, Pentel expressly states that his invention "allows the customer to order items from a (graphical) menu without the necessity to speak to an attendant . . . (resulting) in more accurate orders."

Although some food-ordering apps that allow a customer to enter information via voice exist, these voice-enabled food-ordering apps have at least one visual component that displays to the customer information that is necessary to complete the food order, thus requiring the customer to avert their eyes from the road for some amount of time to place an order successfully. As a result, vehicle accidents are likely to increase amongst customers who use these apps while driving.

As opposed to the apps described above, the current disclosure discusses a food-ordering smartphone app that does not require the customer to avert their eyes from the road to order food from a restaurant. This disclosure describes such mechanisms.

An example scenario for using the disclosed safe food-ordering app while driving is as follows. A customer, who is currently driving a vehicle, feels hungry and wants to order food from a restaurant. The customer launches a food-ordering app on the customer's smartphone. The food-ordering app detects that the vehicle is moving; as a result, the food-ordering app disables manual input into the app, enables voice input into the app, and connects to a terminal at a call center. A customer service representative ("CSR") at the call center uses the terminal to communicate with the customer using spoken language. The CSR communicates with the customer to obtain the details of the food order, enters the food order into a computerized ordering system, and transmits the food order via the computerized ordering system to the restaurant for fulfillment. Finally, the customer picks up the ordered food at the restaurant, possibly using a drive-thru window at the restaurant. Thus, by using the system for safe food ordering by voice while driving, the customer is able to complete an order for food without having to stop driving and without averting their eyes from the road.

Figure 1:
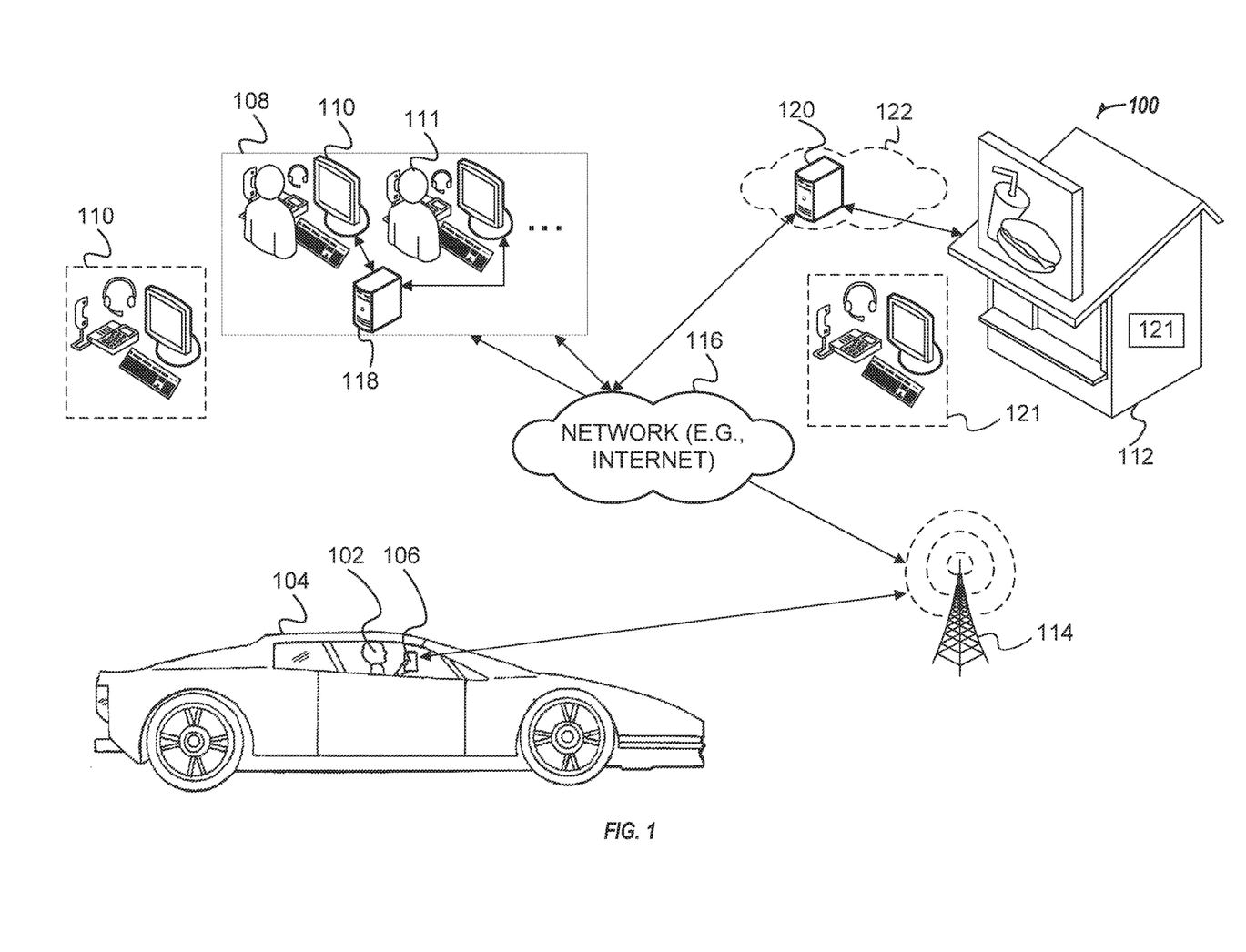
FIG. 1 illustrates a system for safe food ordering by voice while driving, according to an example embodiment.

FIG. 1 illustrates a system 100 for safe food ordering by voice while driving, according to an example embodiment. The system 100 includes a customer 102, a vehicle 104, a mobile communications device 106, a food-ordering app executing on the mobile communications device 106, a remote order facilitation system 108, a remote terminal 110 at the remote order facilitation system 108, one or more CSRs 111, a restaurant 112, and one or more networks 116, such as the Internet. In an example, the system 100 also includes one or more base transceiver stations (BTS) 114, which enables the mobile communications device 106 to connect wirelessly to network(s) 116. In an example, the system 100 also includes one or more computer servers 118, which provide one or more services (e.g., voice telephony, Internet connectivity, etc.) to the remote terminals 110. In an example, the system 100 also includes one or more computer servers 120, which provide one or more services (e.g., order presentation, logistics, etc.) to the restaurant 112.

The vehicle 104 may be any mode of transportation, which requires a person controlling the vehicle 104 to use the person's vision to prevent physical collisions between the vehicle 104 and the vehicle's surroundings. Thus, the vehicle 104 may be a passenger vehicle such as an automobile (terrestrial, aerial, or aquatic), a pickup truck, a boat, or the like. The vehicle 104 may be a commercial vehicle such as a taxi, a semi-trailer truck, a bus, a train car, a subway car, or the like. The vehicle 104 may be a helicopter, an airplane, or even a jetpack.

The mobile communications device is any device 106, which has a display device that produces visual output, a manual input device that receives manual input, and a wireless transceiver that transmits and receives wireless signals. The mobile communications device 106 may be a portable computing device such as a smartphone, a tablet computer, a smart watch, smart glasses, or the like, or it may be an integrated computing device that is integrated into the vehicle 104 (e.g., a dashboard computer). The display may be a physical screen such as a liquid crystal display ("LCD") or light-emitting diode ("LED"), an illuminated screen such as created by a projector, or some combination thereof. The manual input device may be a physical keyboard, a virtual keyboard, a physical touchscreen, a virtual touchscreen, a trackball, a camera that captures gestures, etc.

The food-ordering app may be restaurant chain-specific (e.g., the app can be used to order food from any "Brand X" restaurant.) The food-ordering app may be specific to a group of restaurant chains, such as a group of restaurant chains that are commonly owned (e.g., chain X and chain Y both owned by the same company). The food-ordering app may be specific to one or more individual restaurants 112.

The food-ordering app may have a "default restaurant" setting, enabling the food-ordering app to choose a default restaurant 112. The food-ordering app may default to choosing the participating restaurant 112 closest to at least one of the customer's current location, the customer's destination, and the customer's intended travel route. The current location may be obtained from a GPS unit or may be obtained from the customer 102. The customer's destination may be obtained from the customer 102. "Web mapping" or "web GIS" is the process of using a map delivered by a geographical information system (GIS). One or more of the customer's current location, the customer's destination, and the customer's intended travel route may be obtained from a mapping app using a web GIS system (e.g., Google Maps). The mapping app may be integrated within the food-ordering app, may be a separate app executing on the mobile communications device 106, or may be an app executing on a separate device (e.g., a dashboard computer within the vehicle 104). The food-ordering app may default to choosing the participating restaurant 112 last chosen by either the food-ordering app or the customer 102.

The remote order facilitation system 108 may be a call center; the call center may be located in the same building as the restaurant 112, may be remotely located in another building, or may even be located on another continent. Furthermore, the remote order facilitation system 108 is illustrated in FIG. 1 as one system. However, the system of the remote order facilitation system 108 may physically exist as multiple sub-systems and/or terminals 110 co-located in one building, as multiple sub-systems and/or terminals 110 that are geographically dispersed, or some combination thereof.

The remote terminal 110 allows voice communications, and in an example, data communications between the remote terminal 110 and the customer's mobile communications device 106. The remote terminal 110 may be a telephone, a computer, or a combination of the two. The remote terminal 110 may include a headset or other speaker/microphone unit for the CSR 111 to wear. The remote terminal 110 may execute the food-ordering app directly, may execute an emulation of the food-ordering app, or may use another computerized ordering system. In an example, the remote terminal 110 cooperates with computer server(s) 118 to provide these services.

The one or more computer servers 118 may be located in the same building(s) as the remote order facilitation system 108, may be remotely located in one or more buildings, or may even be located on another continent. In an example, the one or more computer servers 118 may be cloud computing resources located in a "cloud computing" environment (not shown).

The one or more computer servers 120 may be located in the same building as the restaurant 112, may be remotely located in one or more buildings, or may even be located on another continent. In an example, the one or more computer servers 120 may be cloud computing resources located in a "cloud computing" environment 122.

The restaurant 112 includes one or more computer terminals 121 to communicate with the one or more computer servers 120, for example to receive food orders to be fulfilled. Computer terminal 121 may be a telephone, a computer, or a combination of the two. Computer terminal 121 may include a headset or other speaker/microphone unit for a restaurant worker (not shown) to wear.

Figure 2:
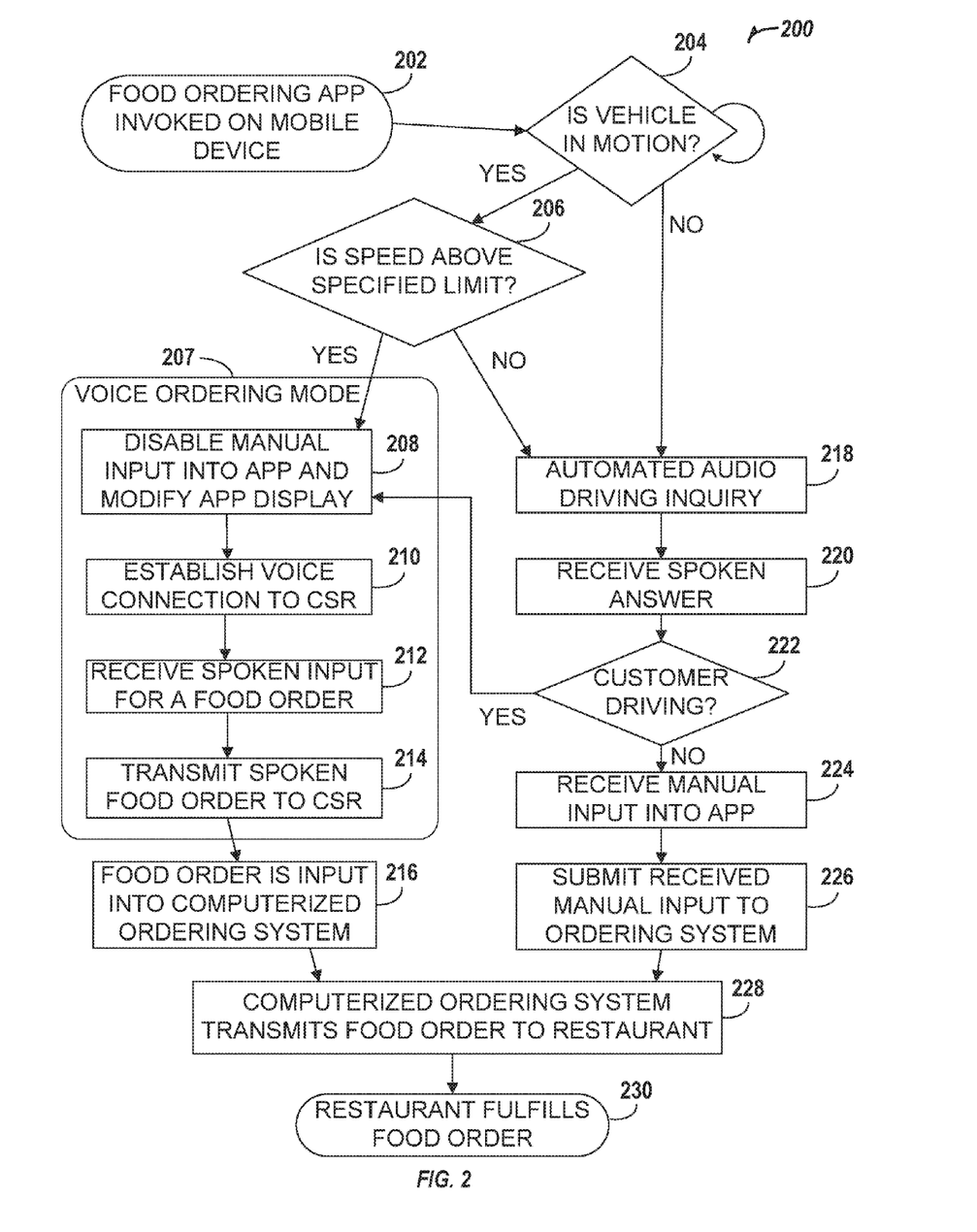
FIG. 2 is a flow diagram of a method for safe food ordering by voice while driving, according to an example embodiment.

FIG. 2 is a flow diagram of a method 200 for safe food ordering by voice while driving, according to an example embodiment. The food-ordering app is invoked on the mobile communications device (operation 202). In an example, the food-ordering app is invoked by a spoken command, thus obviating the need for the customer to divert their eyes from the environment surrounding the vehicle to launch the food-ordering app.

While the food-ordering app is executing, the food-ordering app detects whether the mobile communications device 106 is in motion by using a motion detection system (operation 204). The motion detection system may include a global positioning system (GPS), an accelerometer, a speedometer of the vehicle 104, or some other device. The motion detection system may be integrated into the mobile communications device 106 or may be external to the mobile communications device 106 (e.g., a separate hand-held GPS unit, a GPS unit integrated into the vehicle 104, etc.)

If the mobile communications device 106 is in motion, the mobile communications device 106 uses the motion detection system to determine the approximate speed of the mobile communications device 106 and the food-ordering app determines whether the approximated speed is above a specified speed limit (operation 206). The specified speed limit may be configurable by at least one of the customer 102, the developer of the food-ordering app, a restaurant 112 participating in the services offered by the food-ordering app, etc. For example, restaurant chain X may set the speed limit at 20 mph, restaurant chain Y may set the speed limit at 15 mph, and the customer 102 may set the speed limit at 25 mph. In an example, if multiple speed limits are set, the lowest speed limit is used.

If the approximate speed is above the specified limit, the food-ordering app disables manual input into the app (operation 208) or into the mobile communications device 106 itself. The food-ordering app may also modify the display of the mobile communications device 106 to display nothing, a logo of the restaurant, a message such as "KEEP YOUR EYES ON THE ROAD!," etc.

The food-ordering app establishes a connection to a remote terminal 110 at the remote order facilitation system 108 (operation 210). The connection supports voice data transmissions between the mobile communications device 106 and the remote terminal 110. The connection may be circuit-switched (e.g., a digital or analog connection that is a dedicated network channel established before the nodes may communicate) or packet-switched. If the connection is packet-switched, the connection may also support non-voice data transmissions between the mobile communications device 106 and the remote terminal 110. In an example, the connection is actually multiple connections (e.g., a connection for voice transmissions and another connection for data transmissions).

The customer 102 and the CSR 111 proceed to have an oral conversation regarding the food order as follows. The food-ordering app receives spoken input, captured by a microphone of the mobile communications device 106, corresponding to a food order (operation 212) and transmits the spoken food order to the remote terminal 110 at the remote order facilitation system 108 (operation 214). The food-ordering app may also receive sound waves (e.g., spoken words from the CSR 111) that originated at the remote terminal 110 and that were transmitted by the remote terminal 110 to the mobile communications device 106. The mobile communications device 106 may output the sound waves using a speaker of the mobile communications device 106. In some examples, the communications between the customer 102 and the CSR 111 are full-duplex (e.g., both parties can communicate to the other simultaneously), while in other examples, the communications between the customer 102 and the CSR 111 are half-duplex (e.g., each party can communicate to the other but not simultaneously; the communication is one direction at a time).

One or more portions of the food-ordering system 100 may utilize speech recognition techniques (e.g., speech recognition software) to convert the voice input corresponding to a food order into text. The text of the converted voice input may be displayed to the CSR 111 at the remote order facilitation system 108 to assist the CSR 111 in understanding the customer 102. This can be particularly useful in scenarios where the customer 102 is speaking in a language that is not native to the customer 102, the CSR 111 is speaking in a language that is not native to the CSR 111, the customer's ambient environment is noisy, etc.

The CSR 111 inputs the details of the food order into a computerized ordering system (operation 216). The computerized ordering system may be the same edition or a different edition of the food-ordering app. The computerized ordering system may be executed directly by or may be emulated by the remote terminal 110, the computer server(s) 118, or some combination thereof. In an example, the computerized ordering system is a separate program or set of programs executed by the remote terminal 110 or another device. The computerized ordering system transmits the food order to the intended restaurant 112 (operation 228). Finally, the intended restaurant 112 fulfills the food order (operation 230).

If the vehicle is not in motion (operation 204), or if the approximate speed is not above the specified limit (operation 206), the food-ordering app causes a speaker of the mobile communications device 106 to output an automated audio driving inquiry (operation 218), such as, "Are you currently driving a vehicle?" The food-ordering app waits to receive audio corresponding to a spoken answer (operation 220). Upon receiving a spoken answer (operation 220), the received audio is processed using speech recognition software to determine the spoken answer (operation 222). If the spoken answer is unintelligible, is unrecognizable, or is the word "Yes" or any other word or phrase with a meaning connoting affirmation, the food-ordering app proceeds as if the approximated speed was above the specified speed limit (operations 208-216, 228, and 230).

If the spoken answer is "No" or any other word or phrase with a meaning connoting denial, the food-ordering app enables and receives manual input (operation 224) corresponding to a food order. The customer 102 enters the details of the food order into the food-ordering app; when the customer 102 is finished, the customer 102 selects an appropriate user interface control to indicate that the food order is ready to be submitted. The food-ordering app then submits the received food order to a computerized ordering system (operation 226). The computerized ordering system transmits the food order to the intended restaurant 112 (operation 228). Finally, the intended restaurant 112 fulfills the food order (operation 230). In an example, if the customer's spoken answer is "No" or any other word or phrase with a meaning connoting denial, the food-ordering app records the audio of the customer's spoken answer for liability purposes. The food-ordering app then stores the audio recording on the mobile communications device 106 and/or transmits the audio recording to another location (e.g., the remote order facilitation system 108) for archival.

Whether the food order is placed by voice input or manual input into the food-ordering app, the customer 102 may choose one or more payment options. The customer may choose to pay at the restaurant 112. The customer may choose to pay with one or more of a credit card account, a stored value account (e.g., a gift card), or a payment service (e.g., Google Wallet or Apple Pay), etc.

During its execution, the food-ordering app constantly monitors for vehicle motion (operation 204). If the food-ordering app detects the vehicle is in motion (operation 204) while manual input is enabled (operation 224) into the food-ordering app, the mobile communications device 106 uses the motion detection system to determine the approximate speed of the mobile communications device 106 and the food-ordering app determines whether the approximated speed is above a specified speed limit (operation 206). If the approximated speed is above a specified speed limit (operation 206), the food-ordering app switches to voice ordering mode 207 (beginning with operation 208).

In an example, the food-ordering app captures the manual inputs that had been entered into the food-ordering app (at operation 224) prior to switching from manual input to voice input, and sends this captured manual input to the remote order facilitation system 108. The CSR 111 can use this captured manual input to help the customer 102 resume the order, rather than having to start the order anew. For example, prior to switching from manual input mode to voice ordering mode 207, the customer 102 may have selected a cheeseburger and French fries as a partial order and a restaurant location to fulfill the order. Upon receiving this information, the CSR 111 can confirm the already-selected items, ask whether the customer 102 wants to add another food item to the order, suggest a food item to the customer 102, etc.

Figure 3:
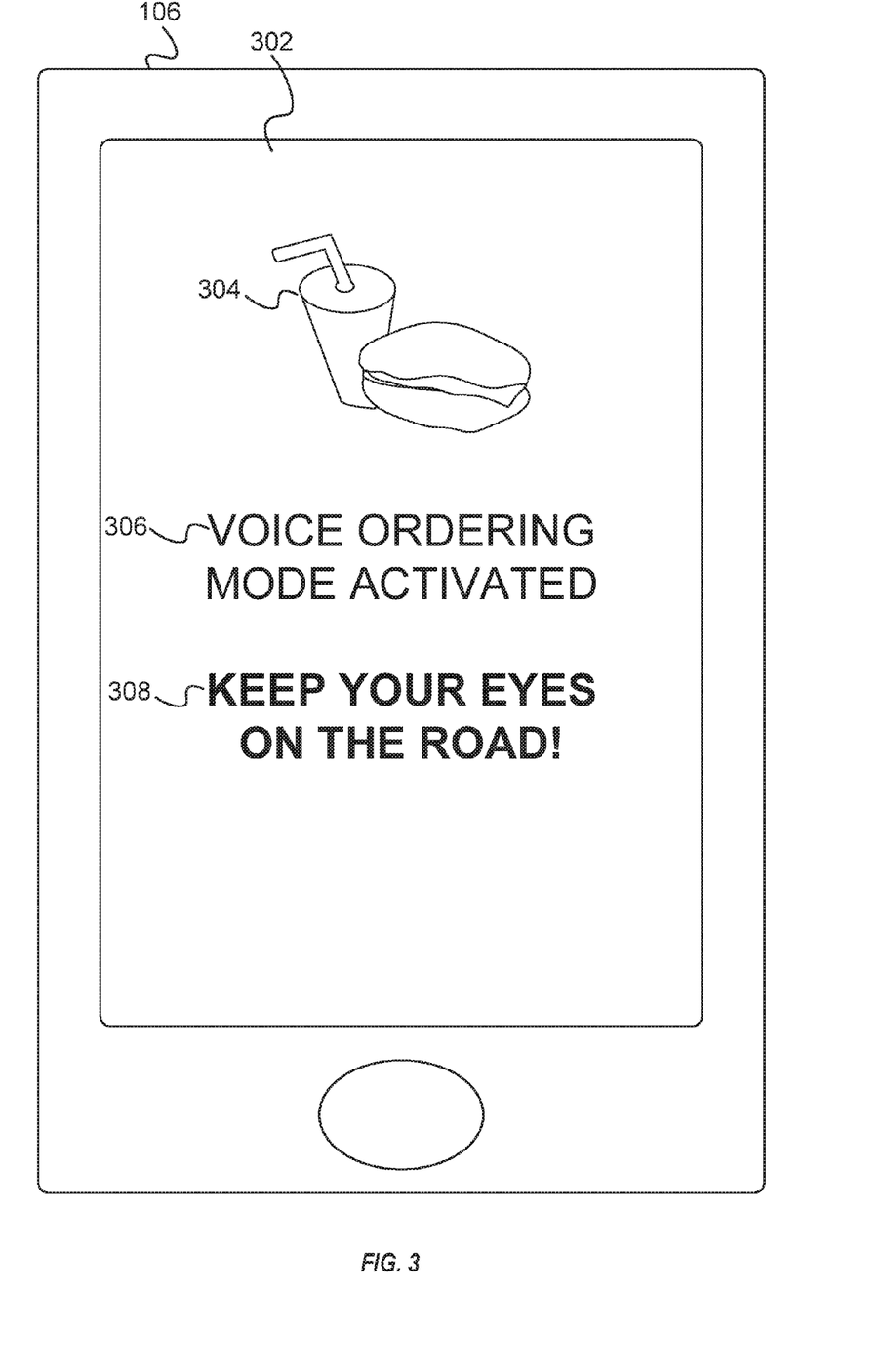
FIG. 3 illustrates a user interface of a food-ordering app in voice ordering mode, according to an example embodiment.

FIG. 3 illustrates a user interface 302 of a food-ordering app in voice ordering mode, according to an example embodiment. In the example embodiment illustrated in FIG. 3, the mobile communications device 106 is a smartphone, however, other types of mobile communications devices 106 are also possible. While in voice ordering mode, the food-ordering app accepts only voice input; manual input into the user interface 302 of the food-ordering app is disabled.

In an embodiment, user interface 302 of the food-ordering app includes one or more of the following: a restaurant name and/or logo 304, a status indicator 306 (e.g., "voice ordering mode activated"), and a message to the user 308 (e.g., "KEEP YOUR EYES ON THE ROAD!").

Figure 4:
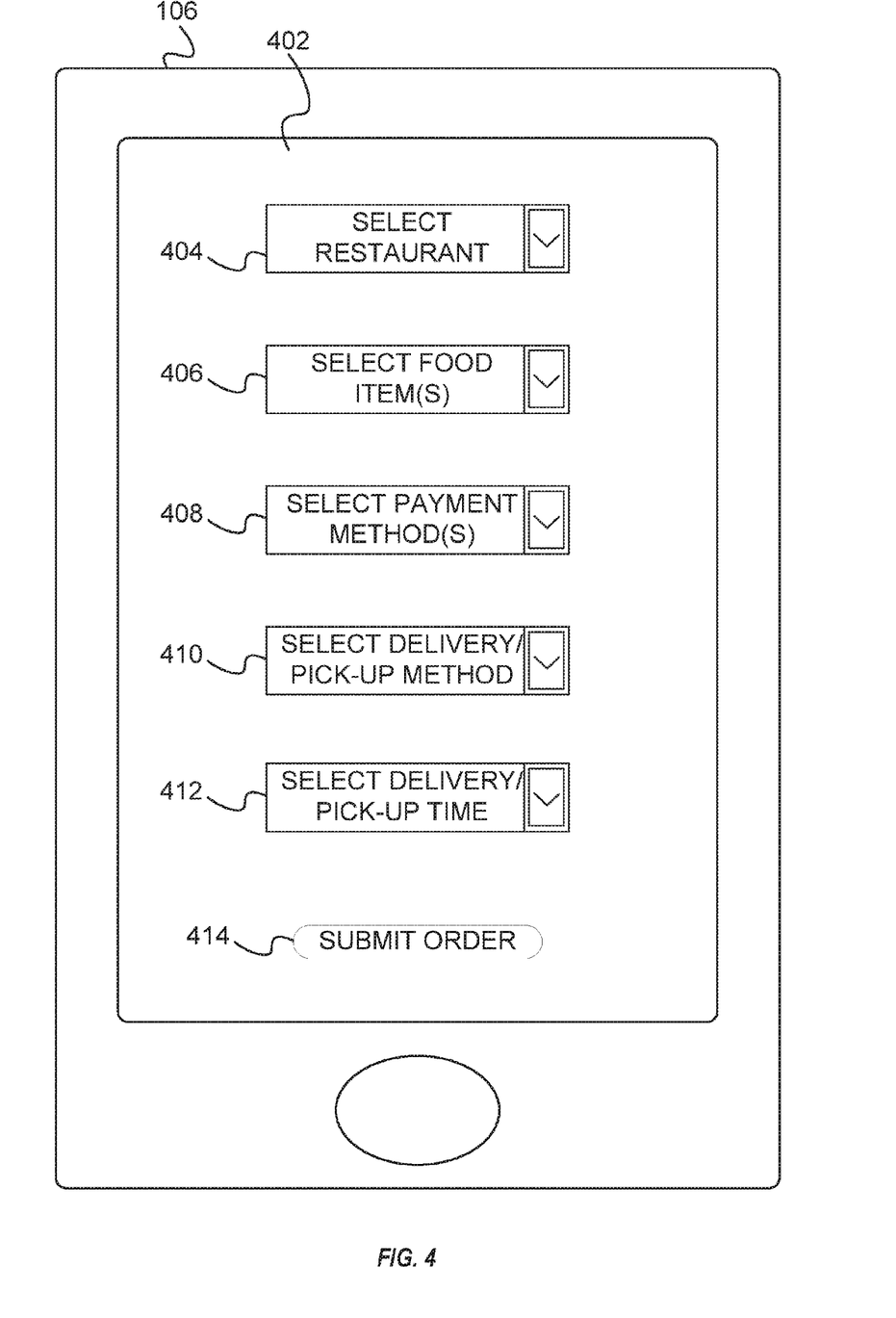
FIG. 4 illustrates a user interface of a food-ordering app in manual input mode, according to an example embodiment.

FIG. 4 illustrates a user interface 402 of a food-ordering app in manual input mode, according to an example embodiment. In the example embodiment illustrated in FIG. 4, the mobile communications device 106 is a smartphone, however, other types of mobile communications devices 106 are also possible. The user interface 402 accepts manual input in situations that do not present a risk of physical collisions between the vehicle 104 and the vehicle's surroundings (e.g., operation 224 of FIG. 2.)

User interface 402 includes a mechanism for selecting a restaurant 112 to fulfill the food order. For example, the user interface 402 illustrated in FIG. 4 includes a select restaurant dropdown control 404. Upon being selected, the select restaurant dropdown control 404 expands to list one or more restaurants 112 that are available for ordering food. Upon the customer 102 selecting a restaurant 112, the user interface 402 closes the select restaurant dropdown control 404, and optionally activates (e.g., selects) the next control(s) in the ordering process.

User interface 402 includes a mechanism for selecting food items from the selected restaurant 112. For example, the user interface 402 illustrated in FIG. 4 includes a select food item(s) dropdown control 406. Upon being selected, the select food item(s) dropdown control 406 expands to list the food item(s) available for ordering at the restaurant 112 selected in the select restaurant dropdown control 404. Upon the customer 102 indicating that the customer 102 has completed selecting the food item(s), the user interface 402 closes the select food item(s) dropdown control 406, and optionally activates (e.g., selects) the next control(s) in the ordering process.

User interface 402 includes a mechanism for selecting one or more payment methods to pay for the food items ordered from the selected restaurant 112. For example, the user interface 402 illustrated in FIG. 4 includes a select payment method(s) dropdown control 408. Upon being selected, the select payment method(s) dropdown control 408 expands to list the payment method(s) that are accepted by the selected restaurant 112 and that are also available to the customer 102. For example, if the restaurant accepts Google Wallet, but the customer 102 does not have a Google Wallet account, the option for Google Wallet will not be displayed (or may be displayed, but not selectable by customer 102). Upon the customer 102 indicating that the customer 102 has completed selecting the payment method(s), the user interface 402 closes the select payment method(s) dropdown control 408, and optionally activates (e.g., selects) the next control(s) in the ordering process.

User interface 402 includes a mechanism for selecting whether the food is to be delivered or picked-up. For example, the user interface 402 illustrated in FIG. 4 includes a select delivery/pick-up method dropdown control 410. Upon being selected, the select delivery/pick-up method dropdown control 410 expands to list the options the selected restaurant 112 offers for making the food available to the customer 102 (e.g., delivery, curbside restaurant pick-up, in-restaurant pick-up, restaurant drive-thru pickup, etc.) Upon the customer 102 selecting a delivery/pick-up method, the user interface 402 closes the select delivery/pick-up method dropdown control 410, and optionally activates (e.g., selects) the next control(s) in the ordering process.

User interface 402 includes a mechanism for selecting a time for the delivery/pick-up method selected by the customer 102. For example, the user interface 402 illustrated in FIG. 4 includes a select delivery/pick-up time dropdown control 412. Upon being selected, the select delivery/pick-up time dropdown control 412 lists the time options the selected restaurant 112 has available for making the food available to the customer 102 via the selected delivery/pick-up method selected by the customer 102. Upon the customer 102 selecting a delivery/pick-up time, the user interface 402 closes the select delivery/pick-up time dropdown control 412, and optionally activates (e.g., selects) the next control(s) in the ordering process.

When the customer 102 is ready to place the food order, the customer 102 selects the "submit order" button 414. The food-ordering app reads the values selected within controls 404-412 and creates a "food order" data structure to represent the selected values. The food-ordering app then sends the food-order data structure to the remote order facilitation system 108, which processes the food order as necessary.

Figure 5:
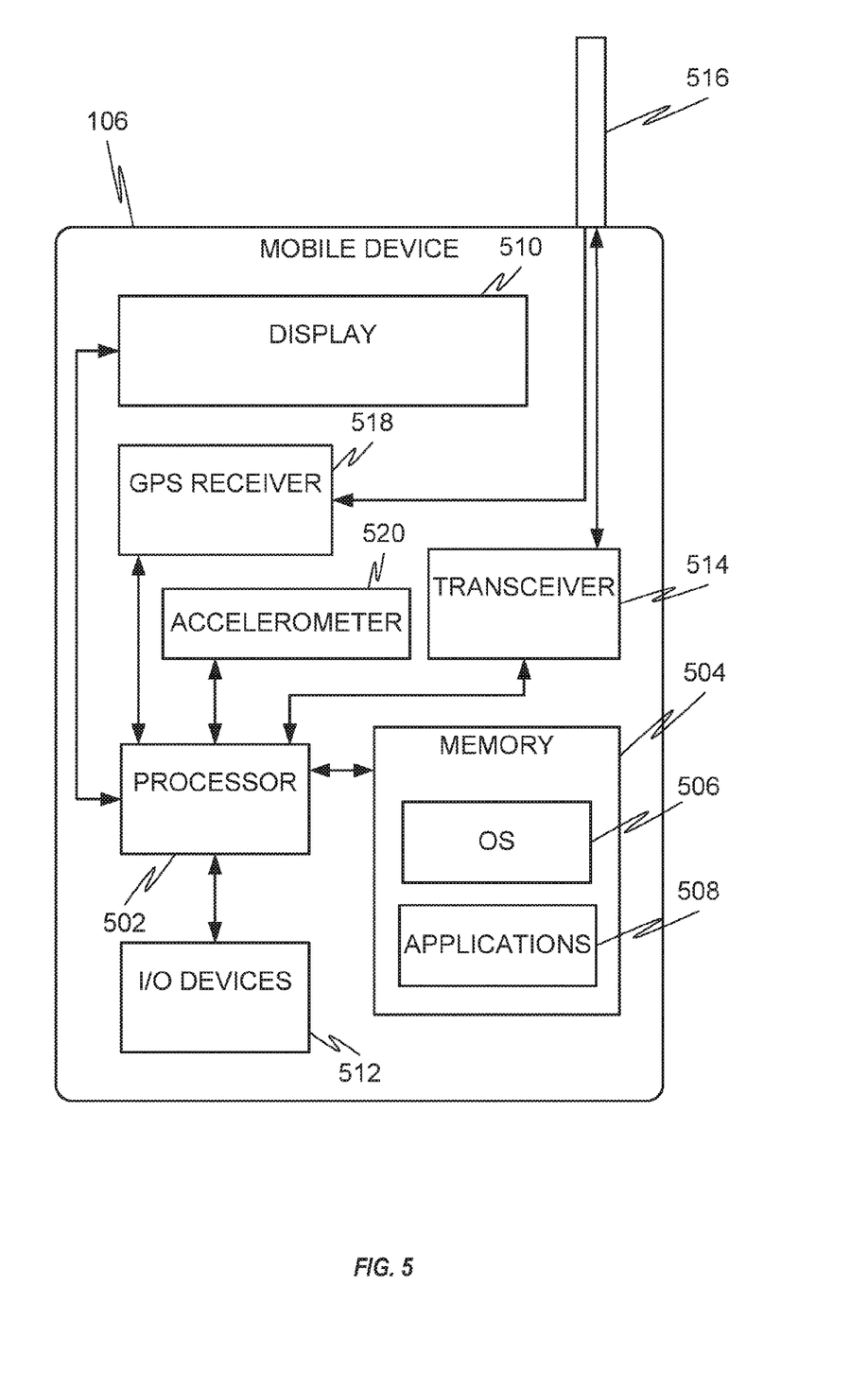
FIG. 5 is a block diagram illustrating a mobile communications device, according to an example embodiment.

FIG. 5 is a block diagram illustrating a mobile communications device 106, according to an example embodiment. The mobile communications device 106 can include a processor 502. The processor 502 can be any of a variety of different types of commercially available processors suitable for mobile communications devices 106 (e.g., an XScale architecture microprocessor, a Microprocessor without Interlocked Pipeline Stages (MIPS) architecture processor, or another type of processor). A memory 504, such as a random access memory (RAM), a flash memory, or other type of memory, is typically accessible to the processor 502. The memory 504 can be adapted to store an operating system (OS) 506, as well as application programs 508, such as a mobile location enabled food-ordering app. The processor 502 can be coupled, either directly or via appropriate intermediary hardware, to a display 510 and to one or more input/output (I/O) devices 512, such as a keypad, a touch panel sensor, a microphone, and the like. In an example, a touchscreen operates as both a display 510 and as an I/O device 512. Similarly, in an example, the processor 502 can be coupled to a transceiver 514 that interfaces with an antenna 516. The transceiver 514 can be configured to both transmit and receive cellular network signals, wireless data signals, or other types of signals via the antenna 516, depending on the nature of the mobile communications device 106. In some configurations, a GPS receiver 518 can also make use of the antenna 516 to receive GPS signals. In some configurations, an accelerometer 520 gathers motion-related data and communicates the data with the processor 502.

Figure 6:
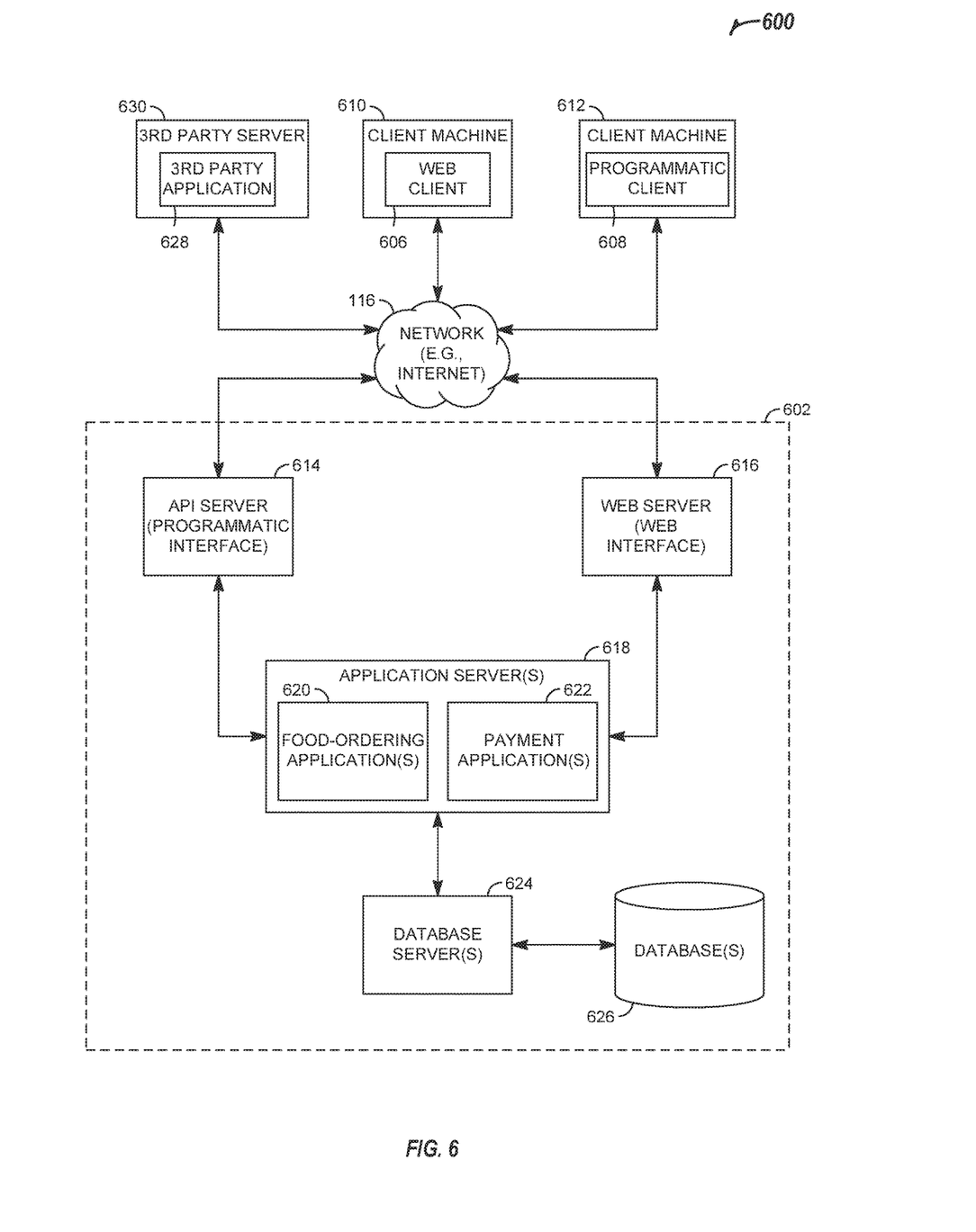
FIG. 6 is a block diagram depicting a client-server network architecture of a system configured for exchanging data over a network, according to an example embodiment.

FIG. 6 is a block diagram depicting a client-server network architecture of a system configured for exchanging data over a network, according to an example embodiment. In the example embodiment, a networked system 602 functions as a computer server 118 or computer server 120, and provides server-side functionality, via a network 116 (e.g., the Internet or a Wide Area Network (WAN)) to one or more client machines (e.g., mobile communications device 106 or remote terminal 110). FIG. 6 illustrates, for example, a web client 606 (e.g., a browser, such as the Internet Explorer browser developed by Microsoft Corporation of Redmond, Wash. State) and a programmatic client 608 executing on respective client machines 610 and 612. Client machines 610 and 612 can comprise mobile communications devices 106 (e.g., smartphones, smartwatches, etc.) or remote terminals 110, as will be discussed in further detail below.

An API server 614 and a web server 616 are coupled to, and provide programmatic and web interfaces respectively to, one or more application servers 618. The application servers 618 host one or more food-ordering applications 620 and payment applications 622. The application servers 618 are, in turn, shown to be coupled to one or more database servers 624 that facilitate access to one or more databases 626.

The food-ordering applications 620 can provide a number of food-ordering functions and services to customers 102 or CSRs 111 who access the networked system 602. The payment applications 622 can likewise provide a number of payment services and functions to customers 102 or restaurants 112. The payment applications 622 can allow a customer 102 to accumulate value (e.g., in a commercial currency, such as the U.S. dollar, or in a proprietary currency, such as "points") in accounts, and then later to redeem the accumulated value for products (e.g., food) that are made available via the food-ordering applications 620. In an embodiment, the payment applications 622 can process other forms of electronic payment, such as credit cards, debit cards, etc.) Although the food-ordering and payment applications 620 and 622 are shown in FIG. 6 to both form part of the networked system 602, it will be appreciated that, in alternative embodiments, the payment applications 622 can form part of a payment service that is separate and distinct from the networked system 602.

Further, while the client-server system 600 shown in FIG. 6 employs a client-server architecture, the embodiments are, of course not limited to such an architecture, and can equally well find application in a distributed, or peer-to-peer, architecture system, for example.

The web client 606 accesses the various food-ordering and payment applications 620 and 622 via the web interface supported by the web server 616. Similarly, the programmatic client 608 accesses the various services and functions provided by the food-ordering and payment applications 620 and 622 via the programmatic interface provided by the API server 614. The programmatic client 608 can, for example, be a food-ordering app executing on a mobile communications device 106, a food-ordering app executing on or being emulated by a remote terminal 110, a computerized ordering system executing on a remote terminal 110, etc.

FIG. 6 also illustrates a third party application 628, executing on a third party server machine 630, as having programmatic access to the networked system 602 via the programmatic interface provided by the API server 614. For example, the third party application 628 can, utilizing information retrieved from the networked system 602, support one or more features or functions on a website hosted by the third party. The third party website can, for example, provide one or more promotional, marketplace, or payment functions that are supported by the relevant applications of the networked system 602.

Figure 7:
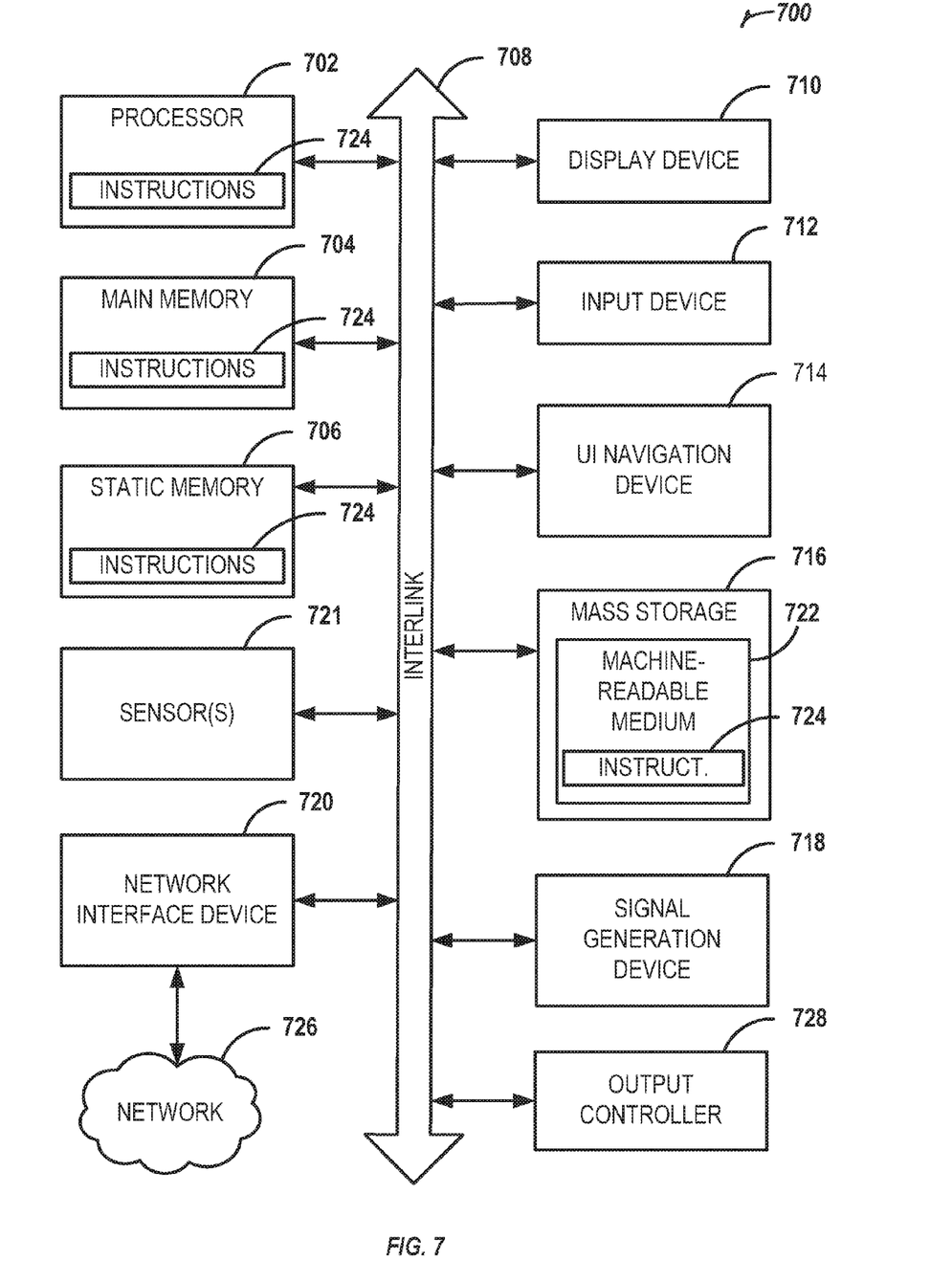
FIG. 7 is a block diagram illustrating an example of a machine, upon which one or more embodiments may be implemented.

FIG. 7 illustrates a block diagram of an example machine 700 upon which any one or more of the techniques (e.g., methodologies) discussed herein may perform. The machine 700 is any device, which has a display device that produces visual output, a manual input device that receives manual input, and a wireless transceiver that transmits and receives wireless signals. The machine 700 may be a portable computing device such as a smartphone, a tablet computer, a smart watch, smart glasses, or the like, an integrated computing device that is integrated into the vehicle (e.g., a dashboard computer), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine-readable media.

Although the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A method of communicating a food order while a customer is driving a vehicle, the method comprising:
using one or more computer processors of a communications device:
creating a graphical user interface (GUI) that is output to a display of the communications device;
receiving a manual input from an input device, the input relating to one or more GUI elements of the GUI, the input indicating partial information about a food order;
monitoring a speed of the communication device calculated based upon received data from one of an accelerometer or a global positioning system receiver of the communication device;
responsive to a determination that the speed of the communications device is above a specified speed threshold:
disabling input from the input device and entering a voice input mode;
initiating, using communications circuitry of the communications device, a wireless data connection, over a computer network, between the communications device and a remote communications device at a remote order facilitation system;
transmitting, using the wireless data connection, data generated based upon the input received before the input from the input device was disabled, the data conveying a portion of the food order to the remote communications device;
receiving, at a microphone of the communications device, voice input corresponding to a second portion of the food order to be fulfilled by a restaurant;
converting the voice input into one or more data packets;
transmitting, via the wireless data connection, the data packets to the remote communications device at the remote order facilitation system to send the second portion of the food order;
upon completion of the food order, receiving, from the remote communications device via the wireless data connection, an indication that the food order was successfully received by the remote communications device; and
generating an indication that the food order is being processed to be fulfilled at the restaurant.

2. The method of claim 1, wherein the restaurant is a restaurant chosen by a user from the GUI.

3. The method of claim 1, wherein the voice input corresponding to the second portion of the food order includes an indication for payment of the food order through at least one payment service.

4. The method of claim 3, wherein the at least one payment service is a credit card.

5. The method of claim 3, wherein the at least one payment service is a stored-value account.

6. The method of claim 1, wherein the indication that the food order is being processed is an audio indication generated at a speaker.

7. The method of claim 1, wherein converting the voice input into one or more data packets comprises utilizing speech recognition software to convert the voice input corresponding to the food order into text corresponding to the voice input, and inserting the text into one or more data packets.

8. A communication device for communicating a food order while a customer is driving a vehicle, the communication device comprising:
a computer processor;
a memory, comprising instructions, which when executed by the computer processor, causes the computer processor to perform operations comprising:
creating a graphical user interface (GUI) that is output to a display of the communications device;
receiving a manual input from an input device, the input relating to one or more GUI elements of the GUI, the input indicating partial information about a food order;
monitoring a speed of the communication device calculated based upon received data from one of an accelerometer or a global positioning system receiver of the communication device;
responsive to a determination that the speed of the communications device is above a specified speed threshold:
disabling input from the input device and entering a voice input mode;
initiating, using communications circuitry of the communications device, a wireless data connection, over a computer network, between the communications device and a remote communications device at a remote order facilitation system;
transmitting, using the wireless data connection, data generated based upon the input received before the input from the input device was disabled, the data conveying a portion of the food order to the remote communications device;
receiving, at a microphone of the communications device, voice input corresponding to a second portion of the food order to be fulfilled by a restaurant;
converting the voice input into one or more data packets;
transmitting, via the wireless data connection, the data packets to the remote communications device at the remote order facilitation system to send the second portion of the food order;
upon completion of the food order, receiving, from the remote communications device via the wireless data connection, an indication that the food order was successfully received by the remote communications device; and
generating an indication that the food order is being processed to be fulfilled at the restaurant.

9. The device of claim 8, wherein the restaurant is a restaurant chosen by a user from the GUI.

10. The device of claim 8, wherein the voice input corresponding to the second portion of the food order includes an indication for payment of the food order through at least one payment service.

11. The device of claim 10, wherein the at least one payment service is a credit card.

12. The device of claim 10, wherein the at least one payment service is a stored-value account.

13. The device of claim 8, wherein the indication that the food order is being processed is an audio indication generated at a speaker.

14. The device of claim 8, wherein the operations of converting the voice input into one or more data packets comprises operations of utilizing speech recognition software to convert the voice input corresponding to the food order into text corresponding to the voice input, and inserting the text into one or more data packets.

15. A non-transitory machine-readable medium comprising instructions, which when executed by a communication device, causes the communication device to perform operations comprising:
- creating a graphical user interface (GUI) that is output to a display of the communications device;
- receiving a manual input from an input device, the input relating to one or more GUI elements of the GUI, the input indicating partial information about a food order;
- monitoring a speed of the communication device calculated based upon received data from one of an accelerometer or a global positioning system receiver of the communication device;
- responsive to a determination that the speed of the communications device is above a specified speed threshold:
  - disabling input from the input device and entering a voice input mode;
  - Initiating, using communications circuitry of the communications device, a wireless data connection, over a computer network, between the communications device and a remote communications device at a remote order facilitation system;
  - transmitting, using the wireless data connection, data generated based upon the input received before the input from the input device was disabled, the data conveying a portion of the food order to the remote communications device;
  - receiving, at a microphone of the communications device, voice input corresponding to a second portion of the food order to be fulfilled by a restaurant;
  - converting the voice input into one or more data packets;
  - transmitting, via the wireless data connection, the data packets to the remote communications device at the remote order facilitation system to send the second portion of the food order;
  - upon completion of the food order, receiving, from the remote communications device via the wireless data connection, an indication that the food order was successfully received by the remote communications device; and
  - generating an indication that the food order is being processed to be fulfilled at a restaurant.

16. The machine-readable medium of claim 15, wherein the restaurant is a restaurant chosen by a user from the GUI.

17. The machine-readable medium of claim 15, wherein the voice input corresponding to the second portion of the food order includes an indication for payment of the food order through at least one payment service.

18. The machine-readable medium of claim 17, wherein the at least one payment service is a credit card.

19. The machine-readable medium of claim 17, wherein the at least one payment service is a stored-value account.

20. The machine-readable medium of claim 15, wherein the indication that the food order is being processed is an audio indication generated at the speaker.

* * * * *